(12) United States Patent
Im et al.

(10) Patent No.: US 12,355,378 B2
(45) Date of Patent: Jul. 8, 2025

(54) INITIAL VERIFICATION METHOD OF REDUNDANT ELECTRIC STEERING SYSTEM

(71) Applicant: HL MANDO CORPORATION, Gyeonggi-do (KR)

(72) Inventors: Cheon Hyuk Im, Gyeonggi-do (KR); Wooseok Won, Gyeonggi-do (KR); DooChang Son, Gyeonggi-do (KR); Youngbeom Kim, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 199 days.

(21) Appl. No.: 18/097,204

(22) Filed: Jan. 14, 2023

(65) Prior Publication Data

US 2023/0344378 A1  Oct. 26, 2023

(30) Foreign Application Priority Data

Apr. 26, 2022  (KR) .......................... 10-2022-051565

(51) Int. Cl.
  *H02P 27/08*  (2006.01)
  *H02P 23/14*  (2006.01)
  *H02P 27/06*  (2006.01)
  *B62D 5/04*  (2006.01)

(52) U.S. Cl.
  CPC .............. *H02P 27/06* (2013.01); *H02P 23/14* (2013.01); *B62D 5/04* (2013.01)

(58) Field of Classification Search
  CPC ......... H02P 27/06; H02P 23/14; H02P 29/027
  See application file for complete search history.

(56) References Cited

U.S. PATENT DOCUMENTS

| | | | |
|---|---|---|---|
| 2019/0077450 A1* | 3/2019 | Sasaki | H02P 27/06 |
| 2019/0097565 A1* | 3/2019 | Hayakawa | H02P 6/085 |
| 2019/0276071 A1* | 9/2019 | Nagashima | H02P 25/22 |
| 2019/0363664 A1* | 11/2019 | Nakamura | H02P 27/06 |
| 2019/0372502 A1* | 12/2019 | Ohashi | H02M 7/53871 |
| 2020/0079421 A1* | 3/2020 | Kano | B62D 5/0484 |
| 2020/0153375 A1* | 5/2020 | Mori | H02M 7/53871 |
| 2020/0198695 A1* | 6/2020 | Kawamura | B62D 5/0463 |
| 2020/0207406 A1* | 7/2020 | Endoh | B62D 5/0481 |

FOREIGN PATENT DOCUMENTS

| | | |
|---|---|---|
| KR | 10-2021-0014337 | 2/2021 |
| KR | 10-2022-0046917 | 4/2022 |

* cited by examiner

*Primary Examiner* — Muhammad S Islam (74) *Attorney, Agent, or Firm* — WOMBLE BOND DICKINSON (US) LLP (57) ABSTRACT

The present disclosure relates to an initial verification method of a redundant electric steering system, and it is a verification method of a redundant electric steering system which includes a redundant ECU for driving a motor by using power from a power supply, and the initial verification method may include the steps of a) verifying the state of power switches constituting the power supply in each microcomputer of a first ECU and a second ECU, and determining a control right to control the motor according to a verification result of a power switch, b) verifying the state of a phase-blocking switch of a first phase breaker of the first ECU having the control right, and c) verifying the state of a phase-blocking switch of a second phase breaker of the second ECU, while the first ECU communicates with the second ECU.

14 Claims, 4 Drawing Sheets

FIG. 1

Prior Art

INITIAL VERIFICATION METHOD OF REDUNDANT ELECTRIC STEERING SYSTEM

CROSS-REFERENCE TO RELATED APPLICATION

This application claims priority to and the benefit of Korean Patent Application No. 10-2022-0051565, filed on Apr. 26, 2022, the disclosure of which is incorporated herein by reference in its entirety.

TECHNICAL FIELD

The present disclosure relates to an initial verification device and method of a redundant electric steering system, and more specifically to an initial verification device and method of a redundant electric steering system, which are capable of detecting whether an added switch is operated according to the safety requirements.

BACKGROUND ART

In general, an electric steering system is applied to most vehicles, and in particular, the electric steering system is used in various fields such as an automatic parking system, a lane keeping system and the like.

In the electric steering system, the vehicle is steered by the motor, and when the inverter that applies power to the motor or the electronic control unit that controls the inverter malfunctions, problems may occur in the steering operation, and this may eventually cause a major problem in the safety of the driver.

In order to solve this problem, various methods have been recently developed and applied. Among these, a redundancy controller with two microcontrollers and two inverters has been developed.

For example, as disclosed in Korean Patent Application No. 10-2022-0046917 (REDUNDANT OPERATING APPARATUS OF MOTOR DRIVEN POWER STEERING SYSTEM, published on Apr. 15, 2022), the configuration including a separate drive motor and a drive device for driving each drive motor has been proposed In addition, a plurality of electronic switches are included in the electronic control unit according to the recent high stability requirements for the electric steering system.

The configuration and operation of the conventional electric steering system will be described in more detail as follows.

Figure 1:
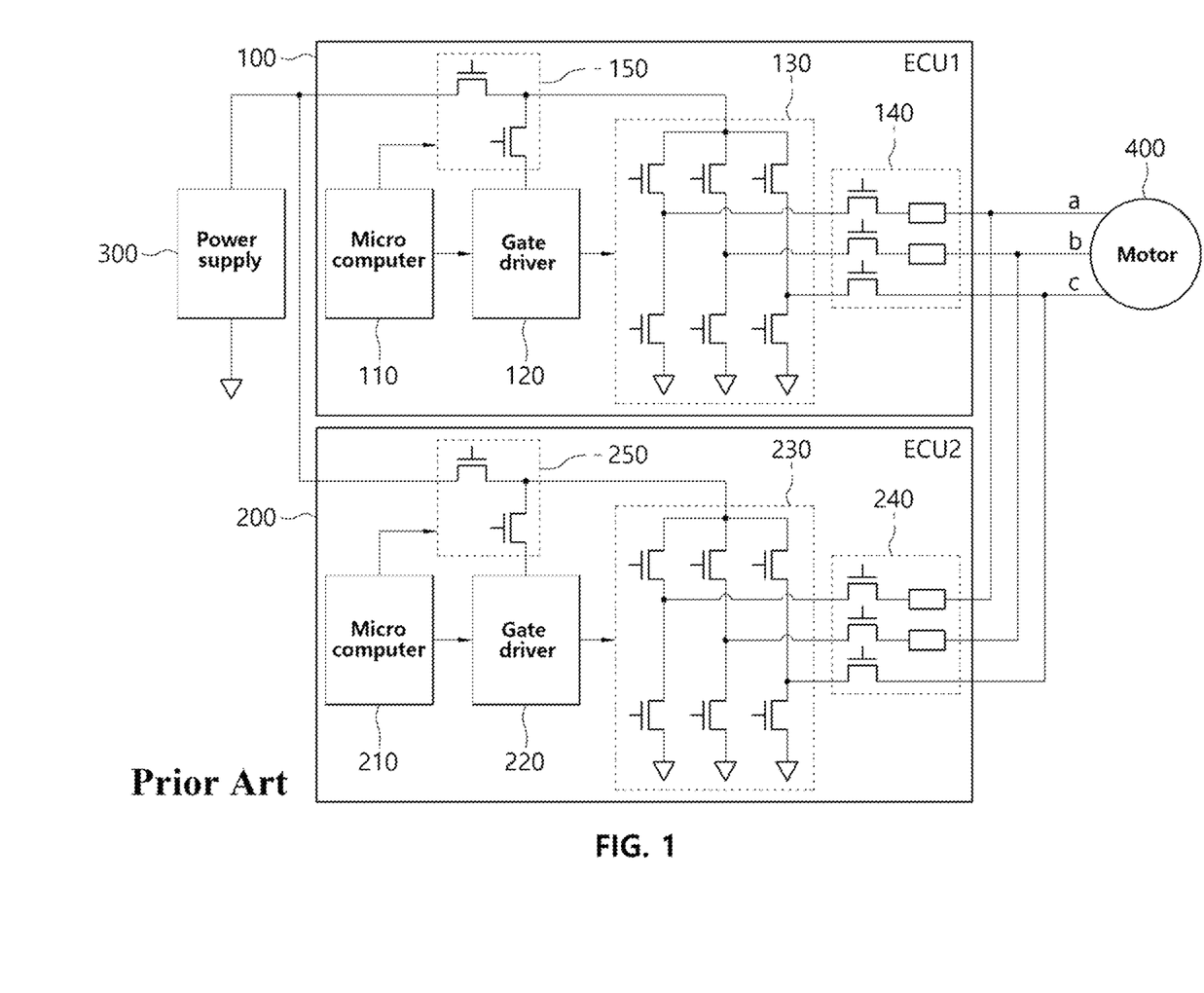
FIG. 1 is a block diagram of a conventional redundant electric steering system.

FIG. 1 is a block diagram of a conventional electric steering system.

Referring to FIG. 1, the conventional electric steering system includes a first electronic control unit 100 (ECU1) and a second electronic control unit 200 (ECU2) for controlling a motor 400 for driving the electric steering system by using the power of the power supply 300, and responding to control abnormality.

The first electronic control unit 100 is configured by including an inverter 130 for driving the motor 400, a phase breaker 140 which is capable of selectively blocking the current of each phase supplied from the inverter 130 to the motor 400, a gate driver 120 for driving and controlling the switches included in the inverter 130 and the phase breaker 140, a power supply unit 150 for supplying and controlling the power of a power supply 300 to the gate driver 120 and the inverter 130, and a microcomputer 110 for controlling the power supply 150 and the gate driver 120 and communicating with the second electronic control unit 200 to achieve a redundant structure.

The second electronic control unit 200 is also configured in the same way as the first electronic control unit 200.

That is, the second electronic control unit 200 is configured to include a microcomputer 210, a gate driver 220, an inverter 230, a phase breaker 240 and a power supply 250.

In this configuration, when the microcomputer 110 of the first electronic control unit 100 detects abnormal occurrence of switches (transistors) constituting the inverter 130, the first switch (S1) and the second switch (S2) of the power supply 150 are controlled in an open state (turned-off state), and communicates with the microcomputer 210 of the second electronic control unit 200 to transfer the control authority to the second electronic control unit 200 so as to control the motor 400.

The phase breakers 140, 240 that are respectively provided in the first electronic control unit 100 and the second electronic control unit 200 include switches that are capable of selectively blocking the three-phase current output of the inverters 130, 230.

During the operation of the inverters 130, 230, an electrical short may occur in a specific switch, and as a result, a braking torque may occur. The braking torque is a torque that is generated when the motor 400 is switched from an operating state to a stop state.

When an abnormal braking torque is generated as described above, the current of the corresponding phase is blocked by using the phase breakers 140, 240 to enable transition to a safe state.

Such phase-blocking switches are described in Korean Patent Application No. 10-2021-0014337 (APPARATUS FOR OPERATING PHASE CUT SWITCH IN MOTOR DRIVEN POWER STEERING APPARATUS, published on Feb. 9, 2021).

However, there is no design strategy or method related to initial driving verification for the occurrence of an abnormality such as a short circuit in the switches constituting the phase breakers 140, 240, and there was a problem in that no means were provided to solve the situation of brake torque occurrences in the case of an abnormality of the phase breaker.

DISCLOSURE

Technical Problem

The technical problem to be solved by the present disclosure in consideration of the above problems is to provide an initial verification device and method of a redundant electric steering system, which are capable of verifying the states of switches included in an ECU in an initial driving state.

In particular, the present disclosure is directed to providing an initial verification device and method of a redundant electric steering system, which are capable of verifying the states of switches of a phase breaker disposed between the three-phase inverter and the motor.

Technical Solution

The initial verification method of a redundant electric steering system according to a preferred exemplary embodiment of the present disclosure to solve the above problems is an initial verification method of a redundant electric steering system which includes a redundant ECU for driving a motor by using power from a power supply, and the initial verification method includes the steps of a) verifying the state of power switches constituting the power supply in each microcomputer of a first ECU and a second ECU, and determining a control right to control the motor according to a verification result of a power switch, b) verifying the state of a phase-blocking switch of a first phase breaker of the first ECU having the control right, and c) verifying the state of a phase-blocking switch of a second phase breaker of the second ECU, while the first ECU communicates with the second ECU.

In an exemplary embodiment of the present disclosure, while a first power switch that supplies a current of the power supply to an inverter among the power switches is turned on, step a) turns off a second power switch which is located between the first power switch and a gate driver to confirm whether a current is supplied to the gate driver so as to confirm whether the second power switch is short-circuited.

In an exemplary embodiment of the present disclosure, the first power switch is controlled to be turned off, and the second power switch is controlled to be turned on to confirm whether the voltage at a contact point between the first power switch and the inverter decreases so as to confirm whether the first power switch is short-circuited.

In an exemplary embodiment of the present disclosure, step a) grants control authority to an ECU with no abnormality in the power supply among the first ECU and the second ECU, and grants control authority to a set ECU, when there is no abnormality in both power supplies of the first ECU and the second ECU, respectively.

In an exemplary embodiment of the present disclosure, step b) controls cut-off switches of the first phase breaker of the ECU in a closed state, forms a current path which passes through the motor by turning on a c-phase high-side switch and a-phase and b-phase low-side switches of the first inverter, and verifies the states of an a-phase cut-off switch and a b-phase cut-off switch according to the detection result of a current flowing in the a-phase and b-phase.

In an exemplary embodiment of the present disclosure, step b) forms a current path which passes through the motor by turning on a-phase and b-phase high-side switches, and a c-phase low-side switch of the first inverter, and verifies the state of a c-phase cut-off switch according to the detection result of a current flowing in the a-phase and b-phase.

In an exemplary embodiment of the present disclosure, step c) controls cut-off switches of the second phase breaker of the second ECU in a closed state while a microcomputer of the first ECU communicates with a microcomputer of the second ECU, forms a current path which passes through the motor by turning on a c-phase high-side switch and a-phase and b-phase low-side switches of the second inverter, and verifies the states of an a-phase cut-off switch and a b-phase cut-off switch according to the detection result of a current flowing in the a-phase and b-phase.

In an exemplary embodiment of the present disclosure, step b) forms a current path which passes through the motor by turning on a-phase and b-phase high-side switches, and a c-phase low-side switch of the second inverter, and verifies the state of a c-phase cut-off switch according to the detection result of a current flowing in the a-phase and b-phase.

The device according to another aspect of the present disclosure is an initial verification device of a redundant electric steering system which includes a redundant ECU for driving a motor by using power from a power supply, wherein the redundant ECU communicates with each other, verifies the state of a power switch included in the power supply, and determines the ECU having the control right to control the motor, and wherein after verifying the state of a phase-blocking switch of a phase breaker included in the ECU having the control right, the ECU having the control right is configured to communicate with the ECU not having the control right to verify the state of a phase-blocking switch in a phase breaker of the ECU not having the control right.

In an exemplary embodiment of the present disclosure, the determination of the ECU having the control right to control the motor is determining that the ECU with no abnormality among redundant ECUs has the control right, by turning off a second power switch located between the first power switch and the gate driver while a first power switch that supplies a current of the power supply to an inverter is turned on among the power switches, to check whether a current is supplied to the gate driver so as to confirm whether the second power switch is short-circuited.

In an exemplary embodiment of the present disclosure, the first power switch is controlled to be turned off, and the second power switch is controlled to be turned on to confirm whether the voltage at a contact point between the first power switch and the inverter decreases so as to confirm whether the first power switch is short-circuited.

In an exemplary embodiment of the present disclosure, the determination of the ECU having the control right to control the motor grants the control right to an ECU that has no abnormality in the power supply among redundant ECUs, and grants the control right to a set ECU if there is no abnormality in all power supplies of each redundant ECU.

In an exemplary embodiment of the present disclosure, cut-off switches included in the phase breaker of the ECU having the control right are controlled in a closed state, and a current path which passes through the motor is formed by turning on a c-phase high-side switch and a-phase and b-phase low-side switches included in the ECU having the control right to verify the states of an a-phase cut-off switch and a b-phase cut-off switch according to the detection result of a current flowing in the a-phase and b-phase.

In an exemplary embodiment of the present disclosure, a current path which passes through the motor is formed by turning on a-phase and b-phase high-side switches and a c-phase low-side switch of the inverter to verify the state of a c-phase cut-off switch according to the detection result of a current flowing in the a-phase and b-phase.

In an exemplary embodiment of the present disclosure, the verification of the state of a phase-blocking switch of the ECU not having the control right is to verify the state of an a-phase cut-off switch and a b-phase cut-off switch according to the detection result of a current flowing in the a-phase and b-phase, by communicating with a microcomputer of the ECU having the control right and a microcomputer of the ECU not having the control right, controlling cut-off switches of the phase breaker of the ECU not having the control right in a closed state, and forming a current path which passes through the motor by turning on a c-phase high-side switch and a-phase and b-phase low-side switches of an inverter included in the ECU not having the control right.

In an exemplary embodiment of the present disclosure, the verification of the state of a phase-blocking switch of the ECU not having the control right is to verify the state of a c-phase cut-off switch according to the detection result of a current flowing in the a-phase and b-phase, by forming a current path which passes through the motor by turning on a-phase and b-phase high-side switches and a c-phase low-side switch of an inverter not having the control right.

Advantageous Effects

The initial verification device and method of a redundant electric steering system according to the present disclosure has an effect of securing the stability and reliability of a system, by verifying the states of switches of a phase breaker in which current and voltage cannot be detected at the motor stage.

MODES OF THE INVENTION

Hereinafter, the initial verification method of a redundant electric steering system according to the present disclosure will be described in detail with reference to the accompanying drawings.

Exemplary embodiments of the present disclosure are provided to describe the disclosure more fully to those of ordinary skill in the art. Exemplary embodiments described below may be modified in different forms, and the scope of the present disclosure is not limited thereto. Rather, these exemplary embodiments are provided so that the present disclosure will be thorough and complete and will fully convey the spirit of the present disclosure to those of ordinary skill in the art.

Terms used herein are intended to describe particular exemplary embodiments and are not intended to limit the scope of the present disclosure. Unless the context clearly indicates otherwise, a singular form may include a plural form. As used herein, the terms "comprise" and/or "comprising" specify the presence of mentioned shapes, numbers, steps, operations, members, elements and/or groups thereof, but do not exclude the presence or addition of at least one other shape, number, step, operation, member, element and/or group thereof. As used herein, the term "and/or" includes any and all combinations of one or more of the associated listed items.

The terms "first," "second" and the like are used to describe various members, areas and/or regions, but do not limit such members, parts, areas, layers and/or regions. These terms do not mean a certain order, top or bottom or priority and are used only to distinguish one member, area or region from another member, area or region. Therefore, a first member, area or region may indicate a second member, area or region without deviating from the spirit of the present disclosure.

Hereinafter, the exemplary embodiments of the present disclosure will be described below with reference to drawings which schematically illustrate the exemplary embodiments. In the drawings, illustrated shapes may change according to, for example, manufacturing technology and/or tolerance. Accordingly, the exemplary embodiments of the present disclosure should not be construed as limited to specific shapes of areas illustrated herein and include changes in shapes that may occur during manufacturing.

Figure 2:
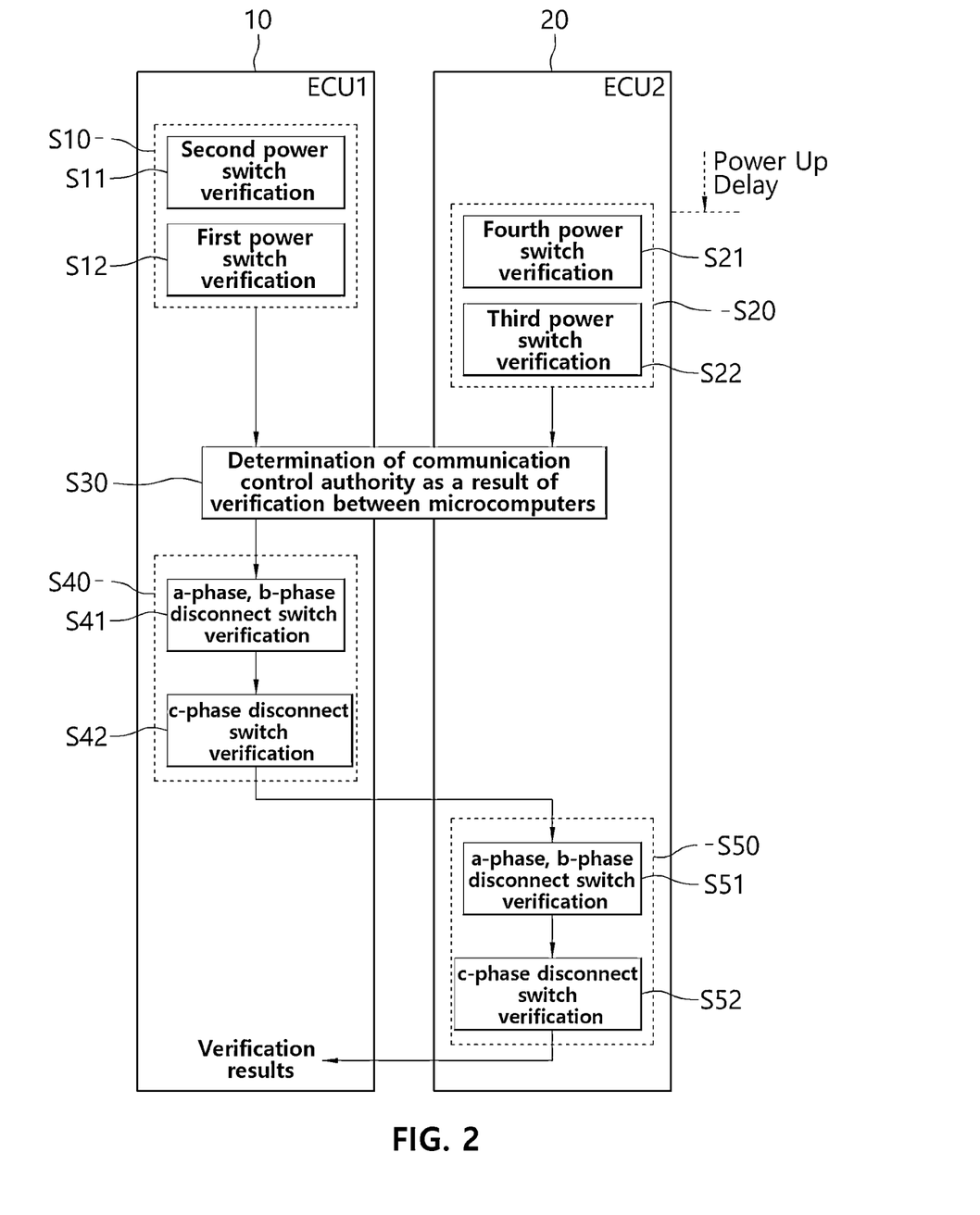
FIG. 2 is a flowchart of the initial verification method of a redundant electric power steering system according to a preferred exemplary embodiment of the present disclosure.

FIG. 2 is a flowchart of the initial verification method of a redundant electric power steering system according to a preferred exemplary embodiment of the present disclosure.

Referring to FIG. 2, the present disclosure provides a step (S10) of checking the states of switches of a first power supply 15 in a first microcomputer 11 of a first ECU 10, a step (S20) of checking the states of switches of a second power supply 25 in a second microcomputer 21 of a second ECU 20, a step (S30) of confirming the checking result of step S10 and the checking result of step S20 through communication between the first microcomputer 11 and the second microcomputer 21, so as to determine the control right of the motor 40, a step (S40) of checking the state of the cut-off switch of each phase of a first phase breaker 14 in the first microcomputer 11 having the motor control right, and a step (S50) of checking the state of the cut-off switch of each phase of a second phase breaker 24 through the communication between the first microcomputer 11 and the second microcomputer 21.

Hereinafter, the configuration and operation of the initial verification method of a redundant electric steering system configured as described above according to the present disclosure will be described in more detail.

First, with reference to FIG. 3, the configuration of the redundant electric steering system to which the present disclosure is applied will be described.

It is assumed that the first ECU 10 and the second ECU 20 share a power supply 30 and a motor 40, respectively, and receive power from the power supply 30 to control the motor 40. The first ECU 10 and the second ECU 20 duplicate the control of the motor 40 that drives the steering device of the electric steering system.

That is, in a state where the first ECU 10 controls the driving of the motor 40, when an abnormality occurs in the first ECU 10, it transfers the control right of driving the motor 40 to the second ECU 20 so as to enable the stable operation of the electric steering system.

The first ECU 10 includes a first microcomputer 11, a first gate driver 12, a first inverter 13, a first phase breaker 14 and a first power supply 15.

In addition, the second ECU 10 has the same configuration as the first ECU 10, and includes a second microcomputer 21, a second gate driver 22, a second inverter 23, a second phase breaker 24 and a power supply 25.

For the convenience of description, the detailed description of the operation will be described with reference to the operation of the first ECU 10. The configuration and operation of the second ECU 20 can be easily understood with reference to the description of the first ECU 10.

In particular, the present disclosure describes by assuming that the first ECU 10 has the control authority of the motor 40. With reference to this description, the operation when the second ECU 20 has the control authority of the motor 40 will also be easily understood.

The first power supply 11 includes a first power switch PS1 and a second power switch PS2.

The first power switch PS1 is a main switch for supplying power from the power supply 10 to the first ECU 10, and the second power switch PS2 is a branch switch that controls the supply of the voltage on a contact side of the first power switch PS1 and the first inverter 13 to the first gate driver 12.

In addition, the second power supply 25 includes a third power switch PS3 that is a main switch, and a fourth power switch PS4 that is a branch switch.

The first inverter 13 is for the control of a three-phase motor 40, is configured by including high-side switches SHA1, SHB1, SHC1 and low-side switches SLA1, SLB1, SLC1 for the a, b and c phases, respectively.

The second inverter 23 also includes high-side switches SHA2, SHB2, SHC2 and low-side switches SLA2, SLB2, SLC2.

The first phase breaker 14 includes a plurality of cut-off switches SBA1, SBB1, SBC1 which are capable of supplying or blocking the output current of each phase of the first inverter 13 to the motor 40, and a-phase and b-phase current sensors SA1, SB1.

The second phase breaker 24 also includes cut-off switches SBA2, SBB2, SBC2, and current sensors SA2, SB2.

The first ECU 10 supplies the power of the power supply 30 to the first inverter 13 and the first gate driver 12 through the first power supply 15. The first gate driver 12 drives the high-side switches SHA1, SHB1, SHC1 and the low-side switches SLA1, SLB1, SLC1 provided in the first inverter 13 under the control of the first microcomputer 11 to output the current for each phase.

In order to prevent a phenomenon in which a specific switch of the first inverter 13 is short-circuited and an unwanted specific phase current is supplied to the motor 40, the first microcomputer 11 may control the cut-off switch of the first phase breaker 14.

For initial verification in the configuration of the redundant electric steering system having such a configuration, in step S10, the first ECU 11 confirms the states of a first power switch PS1 and a second power switch PS2 constituting the first power supply 15.

First, as in step S11, the first ECU 11 turns on the first power switch PS1 of the first power supply 15 and maintains the second power switch PS2 in a turned-off state to check the state of the second power switch PS2.

When the current is supplied to the first gate driver 12 by checking whether current is supplied to the first gate driver 12 in a state where the second power switch PS2 is turned off, it may be determined that the second power switch PS2 is short-circuited.

Next, as in step S12, the first microcomputer 11 turns off the first power switch PS1 and turns on the second power switch PS2. In this case, the voltage on the contact side of the first power switch PS1 and the first inverter 13 must decrease.

If the voltage on the contact side of the first power switch PS1 and the first inverter 13 does not decrease, the first power switch PS1 is short-circuited, and it may be confirmed that the current of the power supply 30 is continuously supplied.

Compared to the operation of the first ECU 10 as described above, the second ECU 20 is delayed by a predetermined time, and performs an initial integrity test for the third power switch PS3 and the fourth power switch PS4 of the second power supply 25 as in step S20.

The reason for the delay of the second ECU 20 is due to a power up delay.

When step S20 is completed, as in step S30, the first microcomputer 11 and the second microcomputer 21 of the first ECU 10 exchange the state information of the first power supply 15 and the second power supply 25 through internal communication.

In this case, the ECU having no abnormality in the power supply controls the motor 40, and if there is no abnormality in both of the first power supply 15 of the first ECU 10 and the second power supply 25 of the second ECU 20, it may be assumed that the first ECU 10 has the control right of the motor 40.

If there is a problem in a specific ECU or all ECUs, the occurrence of abnormality may be displayed through a vehicle display or the like.

In the description of the present disclosure, it will be described that the first ECU 10 has the control authority of the motor 40.

The first microcomputer 11 of the first ECU 10 having the control authority checks the states of the cut-off switches SBA1, SBB1, SBC1 of the first phase breaker 14 as in step S40.

Referring back to FIG. 3, the first microcomputer 11 of the first ECU 10 turns on all of the first power switch PS1 and the second power switch PS2 of the first power supply 15 as in step S41.

Next, by controlling the first gate driver 12, the c-phase high-side switch SHC1 of the first inverter 13 is turned on, and the a-phase and b-phase low-side switches SLA1, SLB1 are turned on.

Figure 3:
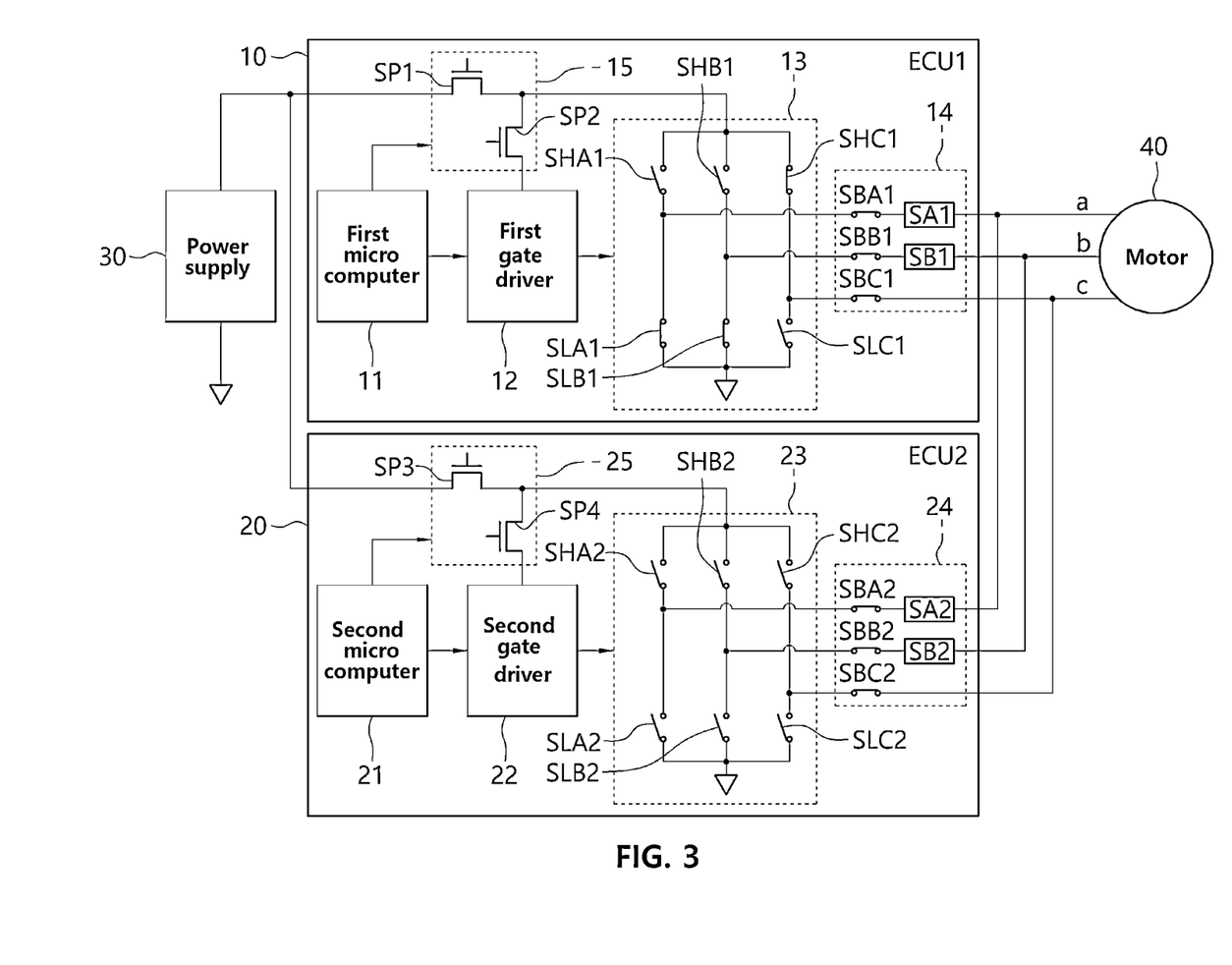
FIGS. 3 and 4 are exemplary diagrams of the state verification of cut-off switches of a phase breaker, respectively.

Through such control, a current path in which the c-phase current is supplied based on the motor 40 as shown in FIG. 3 and the current is outputted through the a-phase and b-phase paths is generated.

Accordingly, it is possible to check the states of the cut-off switches SBA1, SBB1 for the a-phase and the b-phase of the first phase breaker 14.

If no current is detected in a specific current sensor, it may be determined that the cut-off switch of the corresponding phase is open.

Figure 4:
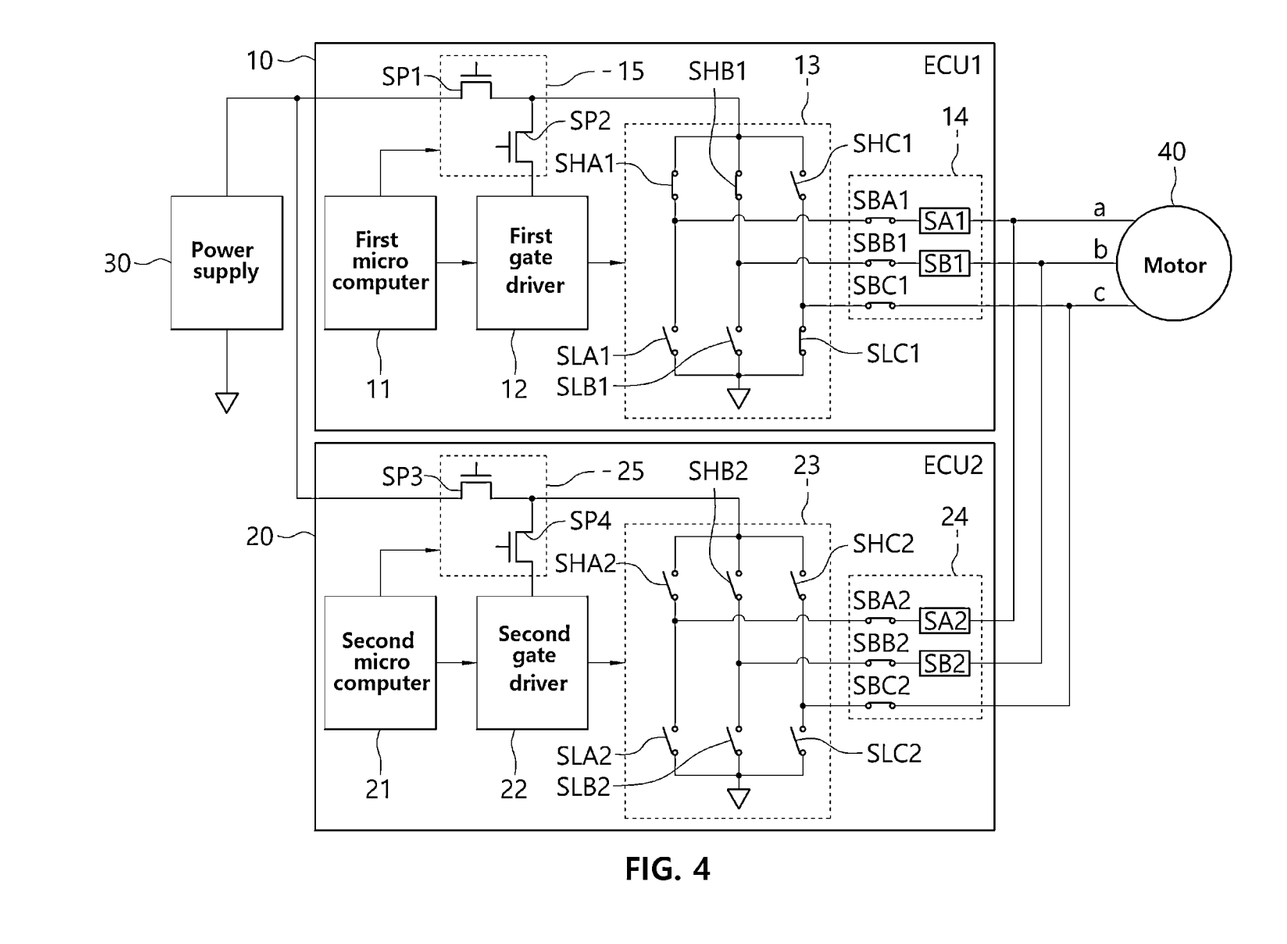

Next, as in step S42, the state of the cut-off switch SBC1 for the c phase is checked.

Referring to FIG. 4, the a-phase and b-phase high-side switches SHA1, SHB1 and the c-phase low-side switch SLC1 are turned on to generate a new current path passing through the motor 40.

The a-phase and b-phase currents are supplied based on the motor 40, and the c-phase current is output.

In this case, by checking the current sensors SA1, SB1 that detect the a-phase and b-phase current, it is possible to check whether the c-phase current is present.

That is, when neither the a-phase nor the b-phase current is detected, it may be determined that the c-phase cut-off switch SBC1 is open.

Through this process, the first ECU 10 having the control authority may check the states of the cut-off switches SBA1, SBB1, SBC1 of the first phase breaker 14.

Processing in the case of an abnormality will be described again below.

Next, the first microcomputer 11 of the first ECU 10 communicates with the second microcomputer 21, as in step S50, so as to check the states of the cut-off switches SBA2, SBB2, SBC2 of the second phase breaker 24.

First, as in step S51, the states of the cut-off switches SBA2, SBB2 of the a phase and b phase are checked, and the state of the cut-off switch SBC2 of the c-phase is checked as in step S52.

The operations of steps S51 and S52 may be easily understood with reference to steps S41 and S42.

Through this method, the present disclosure may perform initial verification on the switches added in the configuration of the redundant electric steering system, and determine the control authority of the redundant ECU according to the initial verification result and display an abnormality so as to guide the driver.

In the above exemplary embodiment in which the first ECU 10 has the control authority, if there is an abnormality in a specific cut-off switch of the first phase breaker 14 as a result of the detection in step S40, the control authority is transferred to the second ECU 20 so as to perform the control of the motor 40 through the second ECU 20.

It will be apparent to those of ordinary skill in the art that the present disclosure is not limited to the above exemplary embodiments and may be variously changed and modified within the scope without departing from the technical gist of the present disclosure.

The invention claimed is:

1. An initial verification method of a redundant electric steering system which comprises a redundant ECU for driving a motor by using power from a power supply, the initial verification method comprising:
   a) verifying a state of power switches constituting the power supply in each microcomputer of a first ECU and a second ECU, and determining a control right to control the motor according to a verification result of a power switch;
   b) verifying the state of a phase-blocking switch of a first phase breaker of the first ECU having the control right; and
   c) verifying the state of a phase-blocking switch of a second phase breaker of the second ECU, while the first ECU communicates with the second ECU,
   wherein while a first power switch that supplies a current of the power supply to an inverter among the power switches is turned on, step a) turns off a second power switch which is located between the first power switch and a gate driver to confirm whether a current is supplied to the gate driver so as to confirm whether the second power switch is short-circuited.

2. The initial verification method of claim 1, wherein the first power switch is controlled to be turned off, and the second power switch is controlled to be turned on to confirm whether a voltage at a contact point between the first power switch and the inverter decreases so as to confirm whether the first power switch is short-circuited.

3. The initial verification method of claim 1, wherein step a) grants control authority to an ECU with no abnormality in the power supply among the first ECU and the second ECU, and grants control authority to a set ECU, when there is no abnormality in both power supplies of the first ECU and the second ECU, respectively.

4. The initial verification method of claim 1, wherein step b) controls cut-off switches of the first phase breaker of the ECU in a closed state, forms a current path which passes through the motor by turning on a c-phase high-side switch and a-phase and b-phase low-side switches of the first inverter, and verifies states of an a-phase cut-off switch and a b-phase cut-off switch according to detection result of a current flowing in the a-phase and b-phase.

5. The initial verification method of claim 1, wherein step c) controls cut-off switches of the second phase breaker of the second ECU in a closed state while a microcomputer of the first ECU communicates with a microcomputer of the second ECU, forms a current path which passes through the motor by turning on a c-phase high-side switch and a-phase and b-phase low-side switches of a second inverter, and verifies states of an a-phase cut-off switch and a b-phase cut-off switch according to detection result of a current flowing in the a-phase and b-phase.

6. The initial verification method of claim 4, wherein step b) forms a current path which passes through the motor by turning on a-phase and b-phase high-side switches, and a c-phase low-side switch of the first inverter, and verifies the state of a c-phase cut-off switch according to the detection result of a current flowing in the a-phase and b-phase.

7. The initial verification method of claim 5, wherein step b) forms a current path which passes through the motor by turning on a-phase and b-phase high-side switches, and a c-phase low-side switch of the second inverter, and verifies the state of a c-phase cut-off switch according to the detection result of a current flowing in the a-phase and b-phase.

8. An initial verification device of a redundant electric steering system which comprises a first ECU and a second ECU for driving a motor by using power from a power supply, wherein the first ECU and the second ECU communicate with each other, verifies the state of a power switch included in the power supply, and determines the first ECU having the control right to control the motor, and
   after verifying the state of a phase-blocking switch of a phase breaker included in the first ECU having the control right, the first ECU having the control right is configured to communicate with the second ECU not having the control right to verify the state of a phase-blocking switch in a phase breaker of the second ECU not having the control right,
   wherein the determination of the first ECU having the control right to control the motor is determining that the second ECU with no abnormality among redundant ECUs has the control right, by turning off a second power switch located between the first power switch and the gate driver while a first power switch that supplies a current of the power supply to an inverter is turned on among the power switches, to check whether a current is supplied to the gate driver so as to confirm whether the second power switch is short-circuited.

9. The initial verification device of claim 8, wherein the first power switch is controlled to be turned off, and the second power switch is controlled to be turned on to confirm whether a voltage at a contact point between the first power switch and the inverter decreases so as to confirm whether the first power switch is short-circuited.

10. The initial verification device of claim 8, wherein the determination of the first ECU having the control right to control the motor assigns the control right to the second ECU that has no abnormality in the power supply between the first ECU and the second ECU, and assigns the control right to a set ECU if there is no abnormality in all power supplies of the first ECU and the second ECU.

11. The initial verification device of claim 8, wherein cut-off switches included in the phase breaker of the first ECU having the control right are controlled in a closed state, and a current path which passes through the motor is formed by turning on a c-phase high-side switch and a-phase and b-phase low-side switches included in the ECU having the control right to verify states of an a-phase cut-off switch and a b-phase cut-off switch according to the detection result of a current flowing in the a-phase and b-phase.

12. The initial verification device of claim 8, wherein the verification of the state of a phase-blocking switch of the second ECU not having the control right is to verify the state of an a-phase cut-off switch and a b-phase cut-off switch according to the detection result of a current flowing in the a-phase and b-phase, by communicating with a microcomputer of the first ECU having the control right and a microcomputer of the second ECU not having the control right, controlling cut-off switches of the phase breaker of the second ECU not having the control right in a closed state, and forming a current path which passes through the motor by turning on a c-phase high-side switch and a-phase and b-phase low-side switches of an inverter included in the second ECU not having the control right.

13. The initial verification device of claim 11, wherein a current path which passes through the motor is formed by turning on a-phase and b-phase high-side switches and a c-phase low-side switch of the inverter to verify the state of a c-phase cut-off switch according to the detection result of a current flowing in the a-phase and b-phase.

14. The initial verification device of claim 12, wherein the verification of the state of a phase-blocking switch of the second ECU not having the control right is to verify the state of a c-phase cut-off switch according to the detection result of a current flowing in the a-phase and b-phase, by forming a current path which passes through the motor by turning on a-phase and b-phase high-side switches and a c-phase low-side switch of an inverter not having the control right.

* * * * *